United States Patent
Kubota

(10) Patent No.: US 8,239,965 B2
(45) Date of Patent: Aug. 7, 2012

(54) METHOD OF CONTROLLING A CONFERENCE SYSTEM, PROGRAM PRODUCT, AND STORAGE MEDIUM

(75) Inventor: Tsutomu Kubota, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 800 days.

(21) Appl. No.: 12/130,625

(22) Filed: May 30, 2008

(65) Prior Publication Data

US 2009/0049520 A1    Feb. 19, 2009

(30) Foreign Application Priority Data

May 31, 2007    (JP) ................................ 2007-145447

(51) Int. Cl.
*G06F 21/00*    (2006.01)

(52) U.S. Cl. ........................................... 726/28; 726/21

(58) Field of Classification Search .............. 726/16–21, 726/28
See application file for complete search history.

(56) References Cited

U.S. PATENT DOCUMENTS

| | | | |
|---|---|---|---|
| 2002/0169832 A1* | 11/2002 | Lee et al. ...................... | 709/205 |
| 2004/0221037 A1 | 11/2004 | Costa-Requena et al. | |
| 2005/0203888 A1* | 9/2005 | Woosley et al. .................. | 707/3 |
| 2006/0168529 A1* | 7/2006 | Rokosz et al. ................. | 715/751 |
| 2006/0173722 A1* | 8/2006 | Mizutani ........................... | 705/8 |
| 2007/0043719 A1* | 2/2007 | Nagamine et al. ................ | 707/5 |

FOREIGN PATENT DOCUMENTS

| | | |
|---|---|---|
| CN | 1394410 | 1/2003 |
| CN | 2742501 | 11/2005 |
| CN | 1784672 | 6/2006 |
| JP | 06-197340 A | 7/1994 |
| JP | 2002-251405 A | 9/2002 |
| JP | 2004-070807 A | 3/2004 |
| JP | 2004-110681 A | 4/2004 |
| JP | 2006-106891 A | 4/2006 |
| JP | 2007-052566 A | 3/2007 |

OTHER PUBLICATIONS

Geyer et al., "Towards a Smarter Meeting Record—Capture and Access of Meetings Revisited," 2005 Springer Science + Business Media, Inc., Multimedia Tools and Applications, 27, 393-410.*

* cited by examiner

*Primary Examiner* — Kambiz Zand
*Assistant Examiner* — Michael Guirguis
(74) *Attorney, Agent, or Firm* — Canon USA Inc. IP Division

(57) ABSTRACT

A conference system includes a storage unit configured to store electronic data used as conference material, a display unit configured to display electronic data stored in the storage unit, an identifying unit configured to identify an attendee of a conference, and a memory unit configured to store information about an attendee identified by the identifying unit as viewing history information in association with electronic data displayed by the display.

10 Claims, 22 Drawing Sheets

FIG. 8

| 2007/04/01 | | | | |
|---|---|---|---|---|
| 10:00 | 001 | A | ENTERED | A |
| 10:05 | 002 | B | ENTERED | A、B |
| 10:05 | 004 | D | ENTERED | A、B、D |
| 10:10 | 003 | C | ENTERED | A、B、C、D |
| 10:45 | 002 | B | EXITED | A、C、D |
| 11:15 | 002 | B | ENTERED | A、B、C、D |
| 11:30 | 001 | A | EXITED | B、C、D |
| ⋮ | ⋮ | ⋮ | ⋮ | ⋮ |
| ⋮ | ⋮ | ⋮ | ⋮ | ⋮ |

```
CONFERENCE SCHEDULE
  REGISTRATION

CONFERENCE NAME | GROUP MEETING          |  —1301
DATE AND TIME   | MAY 1, 2007  15:00~17:00 | —1302
PLACE           | CONFERENCE ROOM        |  —1303
ATTENDEE        | A, B, C, D, E          |  —1304

[REGISTER]    —1305
```

FIG. 14

| CONFERENCE NAME | DATE | | PLACE | ATTENDEE |
|---|---|---|---|---|
| GROUP MEETING | MAY 1, 2007 | 15:00~17:00 | CONFERENCE ROOM | A、B、C、D、E |
| SALES PLAN | MAY 5, 2007 | 10:00~17:00 | CONFERENCE ROOM | F、H |
| MEETING FOR NEW PRODUCT | MAY 8, 2007 | 10:00~12:00 | CONFERENCE ROOM | A、C、E |

| FILE NAME | VIEWING HISTORY OF USER A |
|---|---|
| SCHEDULE. doc | ○ |
| SALES PLAN. ppt | × |
| TEXT. pdf | ○ |
| ADDRESS BOOK. xls | × |

ELECTRONIC DATA LIST 2101　2102

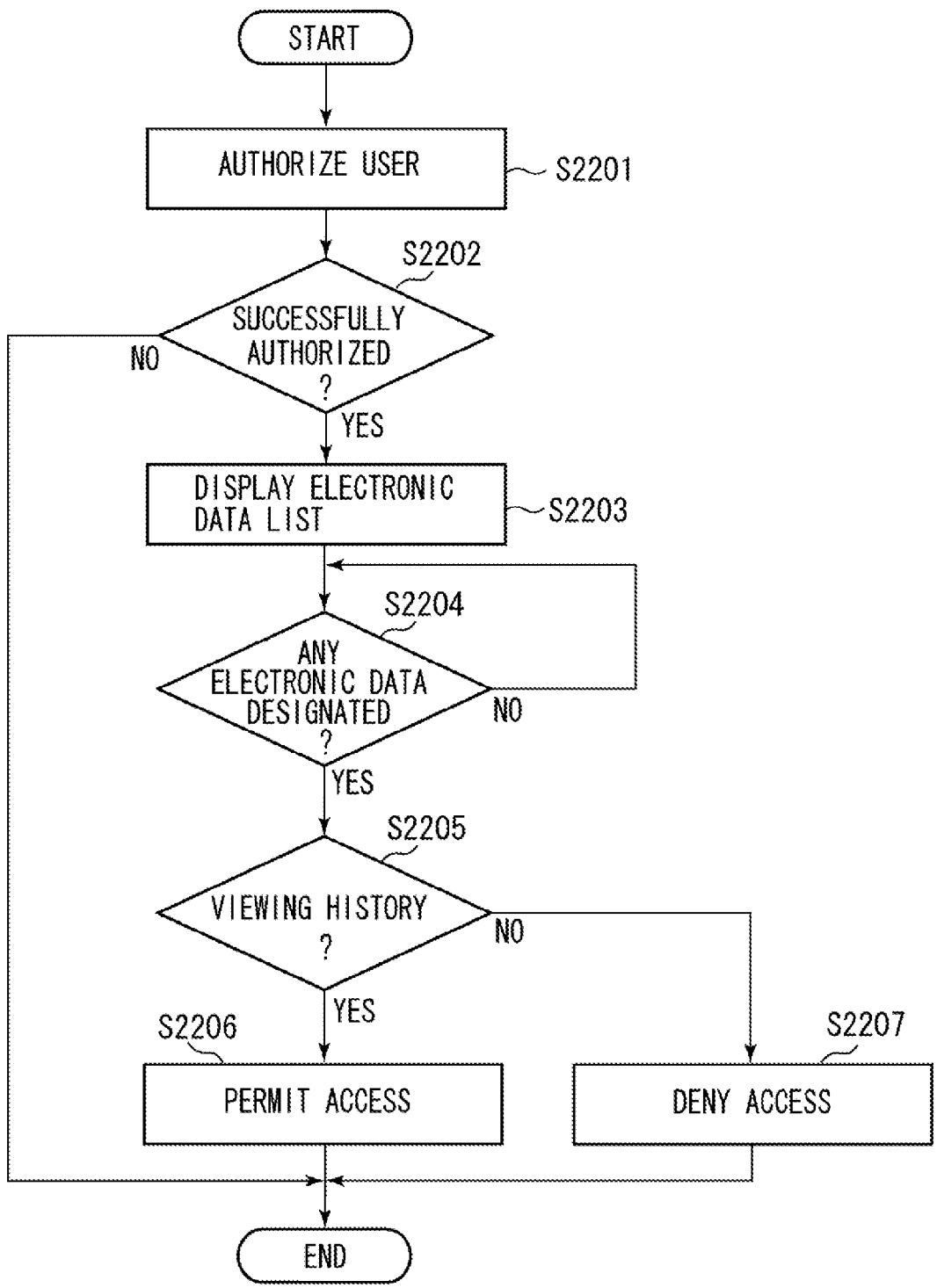

METHOD OF CONTROLLING A CONFERENCE SYSTEM, PROGRAM PRODUCT, AND STORAGE MEDIUM

BACKGROUND OF THE INVENTION

1. Field of the Invention

The present invention relates to a conference system, more specifically, a method of controlling the conference system, a program product, and a storage medium.

2. Description of the Related Art

Conventionally, there exists a conference system in which a plurality of conference attendees can easily share information and proceedings. The conference system can be realized by displaying electronic data on a display equipped in a conference room as conference materials. Further, after the conference, the displayed electronic data is often distributed to the conference attendees at their request from the conference organizer.

In addition, with a recent upsurge in security consciousness, setting and managing the access rights to the displayed electronic data need to be considered. In particular, managing the access rights that limit users who view the displayed electric data is considered in addition to the access rights that limits users who access the electronic data itself.

For example, in a case of displaying files prepared as conference materials using a display apparatus such as a projector, a method discussed in Japanese Patent Application Laid-Open No. 2004-110681 detects users who are around the display device by using their IC cards. Then, attributes of the access right to the displayed file are compared with the access right set for each user to determine whether all of the detected users are allowed to view the displayed file.

As a result, even if there is a single detected user who is not allowed to view the file among the detected users, displaying of the file is canceled. Thus, leakage of confidential information to a user without the access right can be avoided. However, the above-described conventional technique has the following problems.

For example, when some attendees want to bring home the electronic data displayed in the conference, the attendees need to explain to the organizer in details which content of the electronic data they want to bring home, which is a burdensome procedure. In particular, if a lot of electronic data is used as conference materials in a long conference, it is very difficult for attendees to specify desired electronic data after the conference.

Further, from the viewpoint of security, when electronic data including highly-confidential information is used as conference materials, the leakage of the information can be avoided by using the above-described technique discussed in Japanese Patent Application Laid-Open No. 2004-110681. However, usability may be impaired.

In other words, according to the technique discussed in Japanese Patent Application Laid-Open No. 2004-110681, if even a single user among the attendees does not have the access right, displaying of data is canceled. As a result, the data cannot be displayed even if the organizer wants to allow the user having no access right to view the data.

SUMMARY OF THE INVENTION

The present invention is directed to a conference system configured to store information about attendees of a conference in association with electronic data displayed at the conference, a method of controlling the conference system, a program, and a storage medium.

According to an aspect of the present invention, a conference system, includes a storage unit configured to store electronic data used as conference material, a display unit configured to display electronic data stored in the storage unit, an identifying unit configured to identify an attendee of a conference, and a memory unit configured to store information about an attendee identified by the identifying unit as viewing history information in association with electronic data displayed by the display unit at the conference.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 8 illustrates an entry and exit information table according to an exemplary embodiment of the present invention.

FIG. 13 illustrates an operation screen displayed on a display unit of a PC according to an exemplary embodiment of the present invention.

FIG. 14 illustrates a conference schedule information table according to an exemplary embodiment of the present invention.

FIG. 21 illustrates an operation screen displayed on a liquid crystal panel of an operation unit according to an exemplary embodiment of the present invention.

FIG. 22 is a flowchart illustrating an operation for permitting or denying an access to electronic data according to an exemplary embodiment of the present invention.

DETAILED DESCRIPTION OF THE EMBODIMENTS

Various exemplary embodiments, features, and aspects of the invention will be described in detail below with reference to the drawings.

First Exemplary Embodiment

Figure 1:
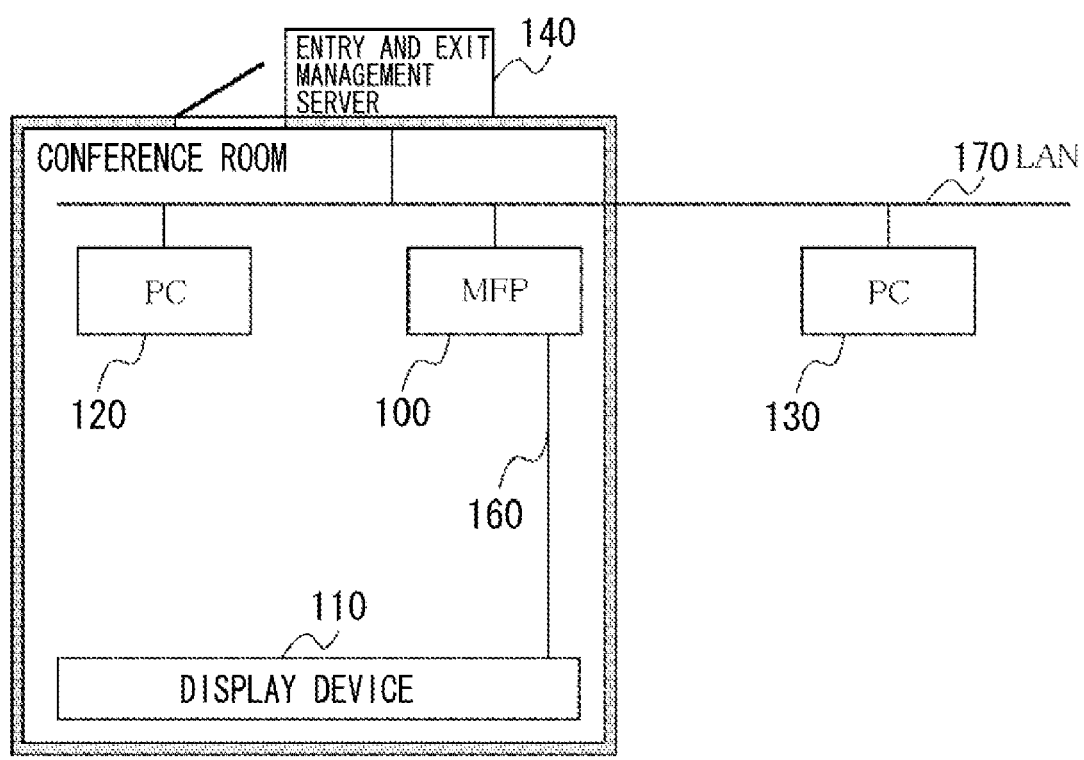
FIG. 1 illustrates a configuration of a conference system according to an exemplary embodiment of the present invention.

FIG. 1 illustrates a configuration of a conference system according to a first exemplary embodiment of the present invention. A conference room is equipped with a multifunctional peripheral (MFP) 100 connected to a local area network (LAN) 170, and a display device 110 connected to the MFP 100 via a cable 160 based on local connection. The display device 110 displays electronic data based on a display signal output from the MFP 100 as conference materials.

As for a method of displaying the data, the MFP 100 may output a display signal to a display device connected to the LAN 170 in place of the display device 110 connected to the MFP 100 through local connection. Alternatively, the MFP may output a display signal to a projecting device such as a projector. The LAN 170 is connected to the MFP 100 as well as personal computers (PCs) 120 and 130, and an entry and exit management server 140.

Figure 2:
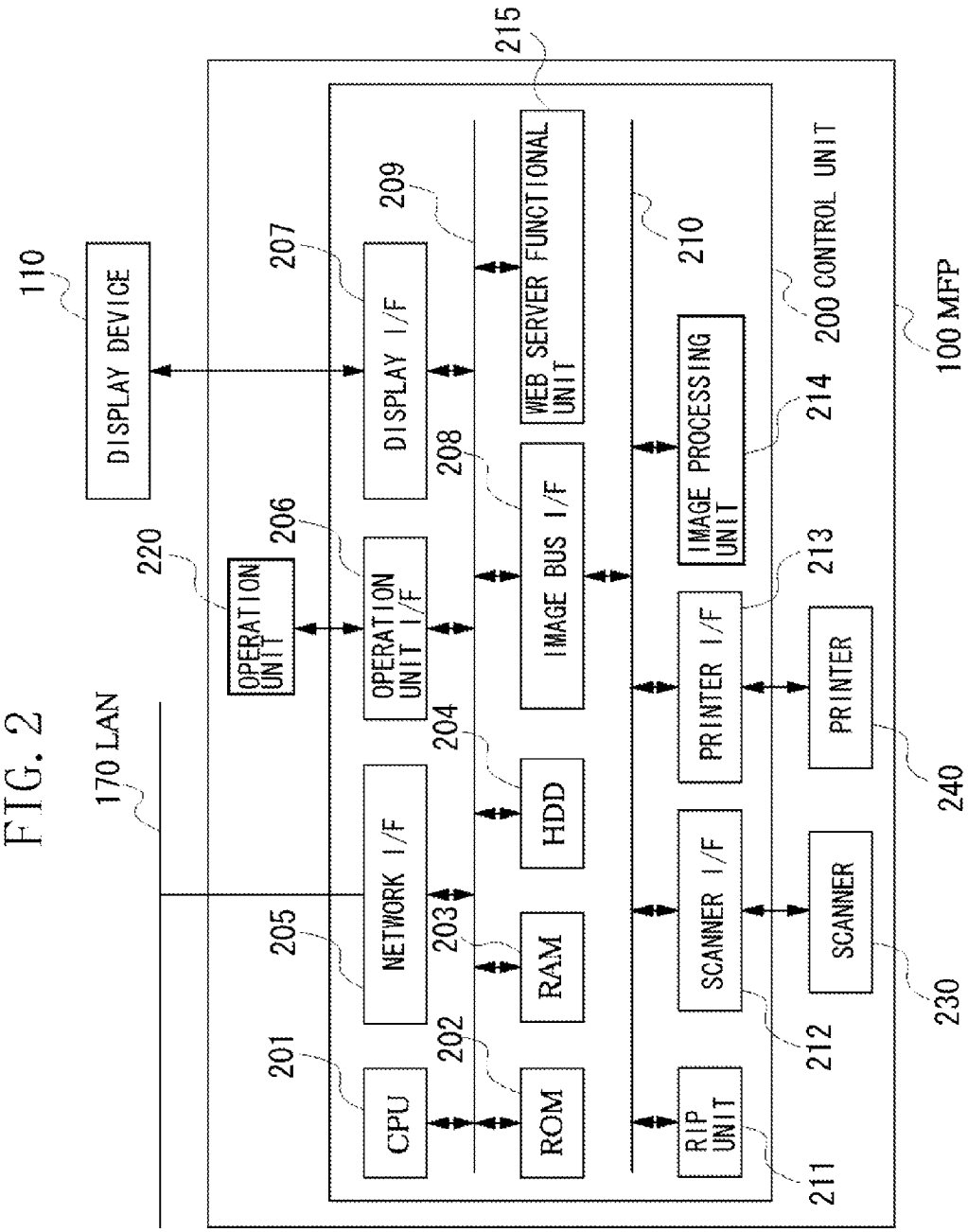
FIG. 2 is a system block diagram illustrating a multifunction peripheral (MFP) according to an exemplary embodiment of the present invention.

FIG. 2 is a system block diagram illustrating the MFP 100. A control unit 200 is connected to a scanner 230 serving as an image input device or a printer 240 serving as an image output device, and configured to control input/output of image data. Further, the control unit 200 is connected to the LAN 170 or the display device 110 and configured to control input/output of image data or display signals. A central processing unit (CPU) 201 controls operations of the MFP 100 and operates according to a program stored in a random access memory (RAM) 203.

The RAM 203 also functions as an image memory for temporarily storing image data. A read only memory (ROM) 202 is a boot ROM, which stores a boot program for booting a system. A hard disk drive (HDD) 204 stores system software, image data, and programs for controlling operations of the MFP 100. Programs stored in the HDD 204 are loaded to the RAM 203, and the CPU 201 controls operations of the MFP 100 based on the programs.

A network interface (I/F) 205 is connected to the LAN 170 and configured to input/output various kinds of information.

An operation unit I/F 206 is an interface connecting the operation unit 220 with the control unit 200. The operation unit I/F 206 outputs image data to the operation unit 220 that is to be displayed on the operation unit 220 Further, the operation unit I/F 206 transmits information input by a user via the operation unit 220 to the CPU 201.

A display I/F 207 is an interface connecting the display device 110 with the control unit 200. The display I/F 207 outputs a display signal to be displayed on the display device 110 to the display device 110. An image bus I/F 208 is an interface connecting a system bus 209 to the image bus 210. The image bus I/F 208 controls high-speed input/output of image data. A raster image processor (RIP) unit 211 rasterizes page description language (PDL) code received from the PC 130 through the LAN 170 and the network I/F 205 into a bitmapped image.

A scanner I/F 212 is an interface connecting the scanner 230 with the control unit 200. The scanner I/F 212 transfers image data input from the scanner 230. A printer I/F 213 is an interface connecting the printer 240 with the control unit 200. The printer I/F 213 transfers image data output from the control unit 200 to the printer 240.

An image processing unit 214 performs various kinds of processing on image data output from the printer 240, such as image correction and resolution conversion. Further, the image processing unit 214 performs various kinds of processing on image data input from the scanner 230 such as image correction, data processing, and editing. A web server functional unit 215 sends a hypertext markup language (HTML) file stored in the HDD 204 to each terminal on the LAN 170 to make available an operation screen for inputting an instruction to the MFP 100.

Figure 3:
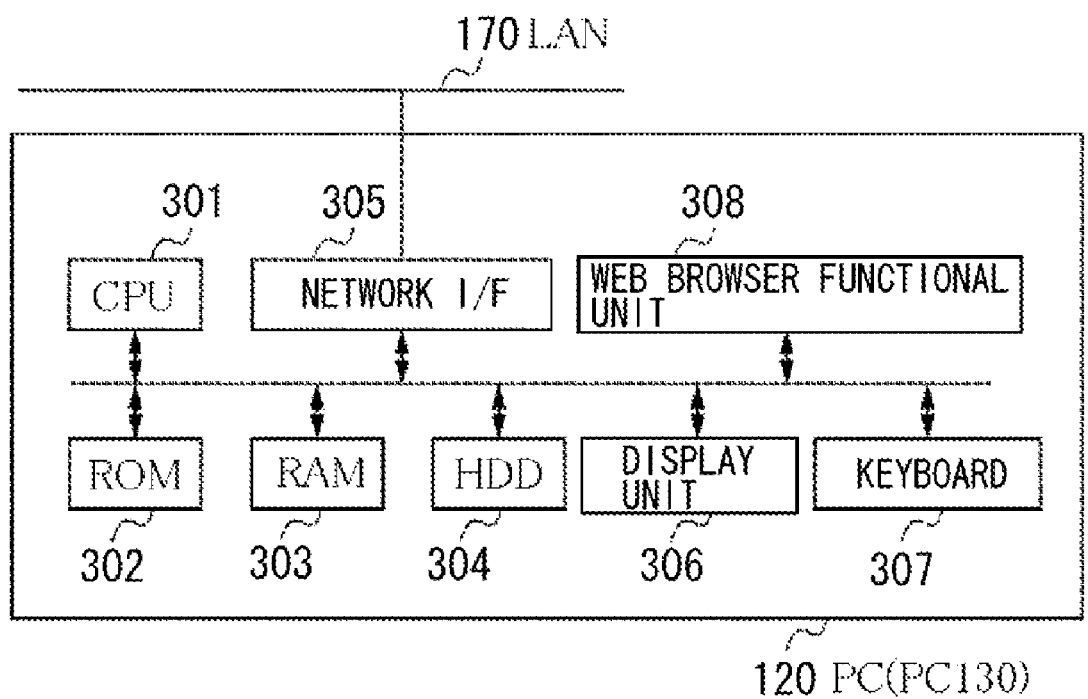
FIG. 3 is a system block diagram illustrating a personal computer (PC) according to an exemplary embodiment of the present invention.

FIG. 3 is a system block diagram illustrating the PC 120. A CPU 301 controls operations of the PC 120 and operates based on programs stored in a RAM 303. The RAM 303 also serves as an image memory for temporarily storing image data. A ROM 302 is a boot ROM, which stores a boot program for booting a system.

An HDD 304 stores system software, image data, and a program for controlling operations of the PC 120. Programs stored in the HDD 304 are loaded to the RAM 303, and the CPU 301 controls operations of the PC 120 based on the programs. A network I/F 305 is connected to the LAN 170 to input/output various kinds of information.

A display unit 306 displays various kinds of information to offer a user interface. To be specific, the display unit 306 displays an operation screen for inputting an instruction for the PC 120 and image data stored in the HDD 304 according to an instruction from the CPU 301. A user enters an instruction for the PC 120 using a keyboard 307 based on data displayed on the display unit 306.

Figure 4:
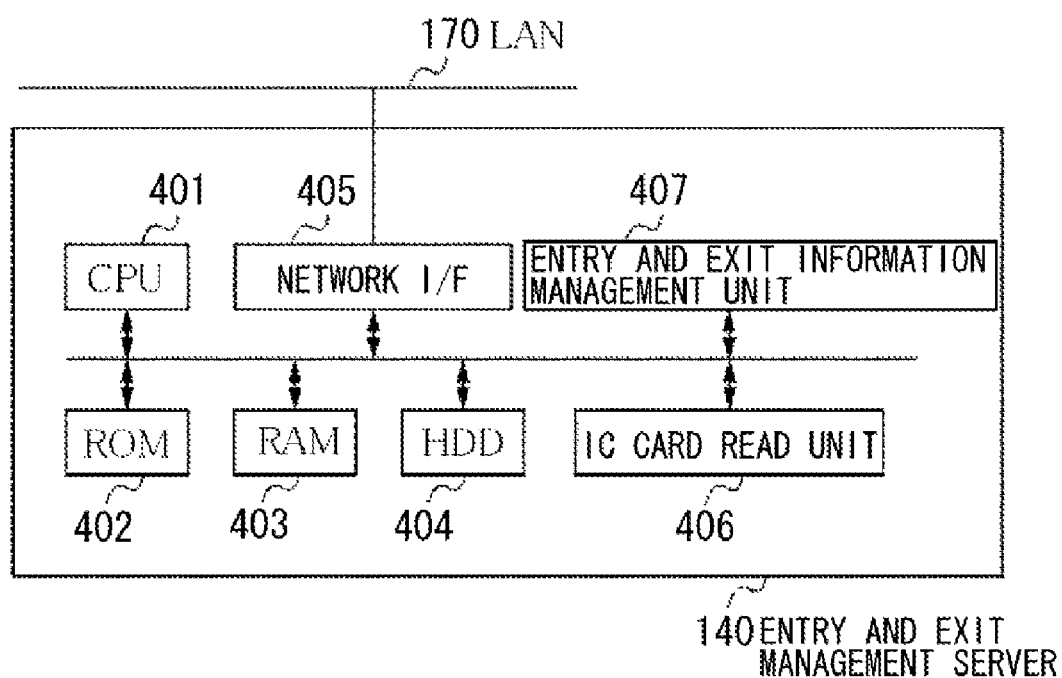
FIG. 4 is a system block diagram illustrating an entry and exit management server according to an exemplary embodiment of the present invention.

A web browser functional unit 308 analyzes an HTML file sent from the web server functional unit 215 of the MFP 100 to display an operation screen on the display unit 306 as described below. The PC 130 has a function similar to that of the PC 120, and thus a description thereof is omitted. FIG. 4 is a system block diagram illustrating the entry and exit management server 140. A CPU 401 controls operations of the entry and exit management server 140 and operates according to programs stored in a RAM 403. A ROM 402 is a boot ROM, which stores a boot program for booting a system.

An HDD 404 stores system software and a program for controlling operations of the entry and exit management server 140. Programs stored in the HDD 404 are loaded to the RAM 403, and the CPU 401 controls operations of the entry and exit management server 140 based on the programs. A network I/F 405 is connected to the LAN 170 to input/output various kinds of information.

An integrated circuit (IC) card reading unit 406 is provided at the doorway of the conference room as illustrated in FIG. 1 to scan an IC card that records a user identification number (ID) for identifying a user. In the first exemplary embodiment, users of the conference room are given an IC card that records a user ID, and each user is permitted to enter the room by holding the IC card over a sensor (IC card reading unit 406).

An entry and exit information management unit 407 manages a user ID read from the IC card by the IC card reading unit 406, and manages entry and exit information representing who enters the conference room and time of entrance and exit. If the PC 130 requests the entry and exit management server 140 to send information representing users who have entered the conference room by a given time, for example, the entry and exit management server 140 reads entry and exit information managed by the entry and exit information management unit 407 and sends back the response.

Figure 5:
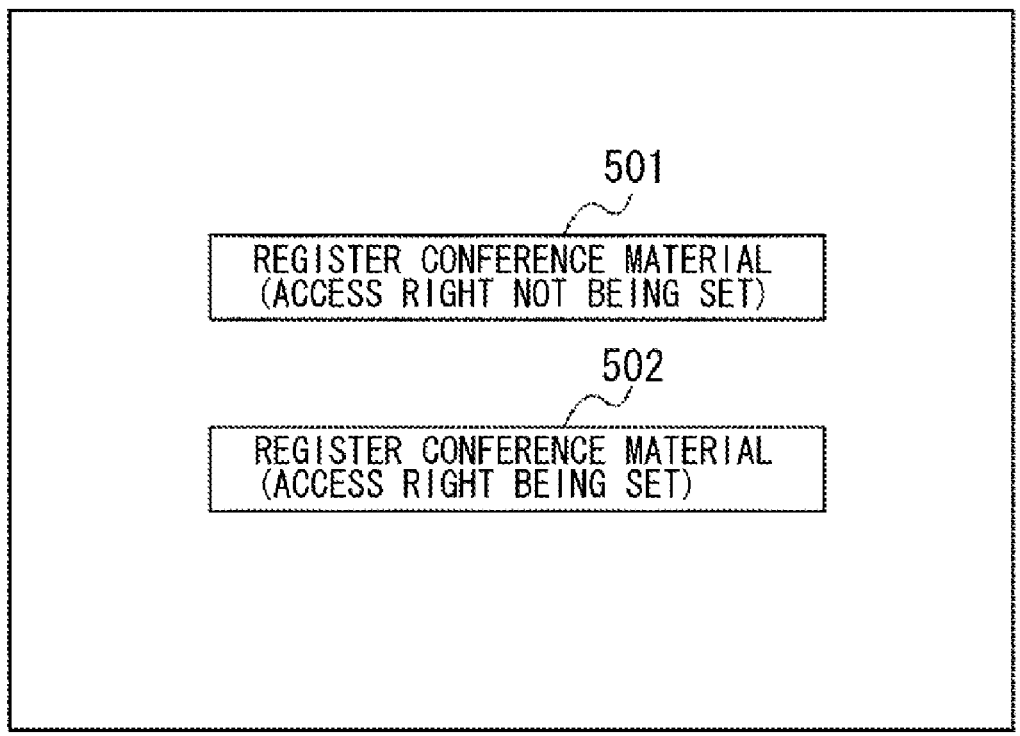
FIG. 5 illustrates an operation screen displayed on a display unit of a PC according to an exemplary embodiment of the present invention.

First, a storage processing of electronic data in the first exemplary embodiment is described. Here, in order to use electronic data stored in the HDD 304 of the PC 130 as conference materials, the data is stored in the HDD 204 of the MFP 100. FIG. 5 illustrates an operation screen displayed on the display unit 306 of the PC 130. The screen of FIG. 5 is displayed, when the PC 130 accesses and requests the MFP 100 to send an HTML file, after analyzing an HTML file sent from the MFP 100 with the web browser functional unit 308.

A user selects a button 501 or 502 on the operation screen of FIG. 5. If viewing authority information is set to electronic data stored as conference materials, the user presses the button 502. On the other hand, if no viewing authority information is set, the user presses the button 501. In the first exemplary embodiment, the user presses the button 501 to store electronic data without setting viewing authority information. The case of selecting the button 502 is described later in another exemplary embodiment.

Figure 6:
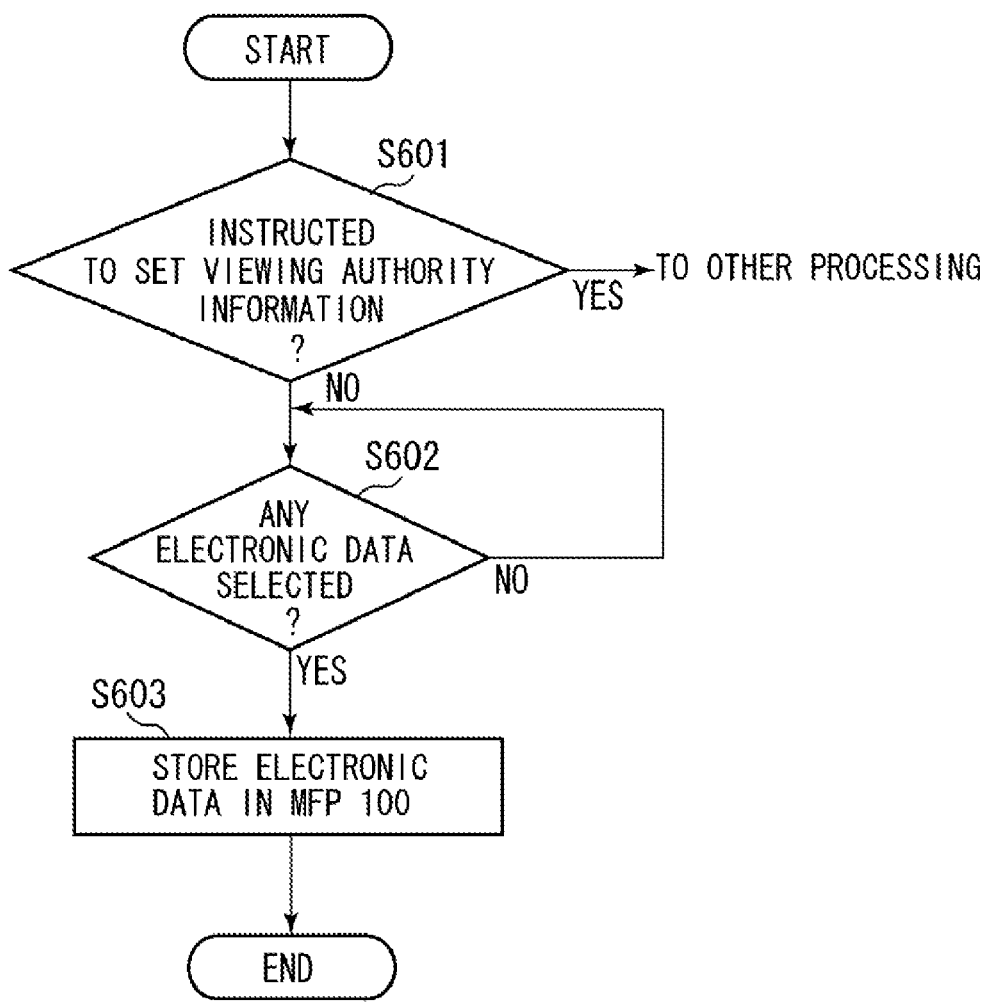
FIG. 6 is a flowchart illustrating an operation for storing electronic data used as conference materials in a hard disk drive (HDD) according to an exemplary embodiment of the present invention.

FIG. 6 is a detailed flowchart illustrating a series of operations for storing electronic data stored in the HDD 304 of the PC 130 in the HDD 204 of the MFP 100 to use the data as conference materials. The CPU 301 of the PC 130 controls these series of operations in the flowchart of FIG. 6 based on programs stored in the HDD 304.

In step S601, the CPU 301 determines whether a user issues an instruction to set viewing authority information to electronic data stored as conference materials. To be more specific, if the button 501 on the operation screen of FIG. 5 is pressed (NO in step S601), the CPU 301 determines not to set viewing authority information, and advances to step S602. On the other hand, if the button 502 is pressed (YES in step S601), the CPU 301 determines to set viewing authority information and executes the other processing.

In step S602, the CPU 301 determines whether at least one of a plurality of electronic data stored in the HDD 304 of the PC 130 is selected and waits until any data is selected. Then, if any electronic data is selected (YES in step S602), in step S603, the CPU 301 sends the selected electronic data to the MFP 100 and stores the data in the HDD 204. In this way, the CPU prepares electronic data to be displayed as conference materials on the display device 110 in the conference room.

Next, display processing of electronic data stored in the HDD 204 of the MFP 100 on the display device 110 during the conference is described. In this example, the MFP 100 generates a display signal corresponding to electronic data stored in the HDD 204 according to an instruction from the PC 120, and outputs the generated display signal to the display device 110 to display the electronic data.

Further, the MFP 100 inquires of the entry and exit management server 140 about users who have entered the conference room by the time of displaying electronic data, and identifies attendees of the conference based on a response from the entry and exit management server 140. Then, the MFP 100 stores information about the identified attendees in association with the electronic data displayed on the display device 110, as viewing history information.

Figure 7:
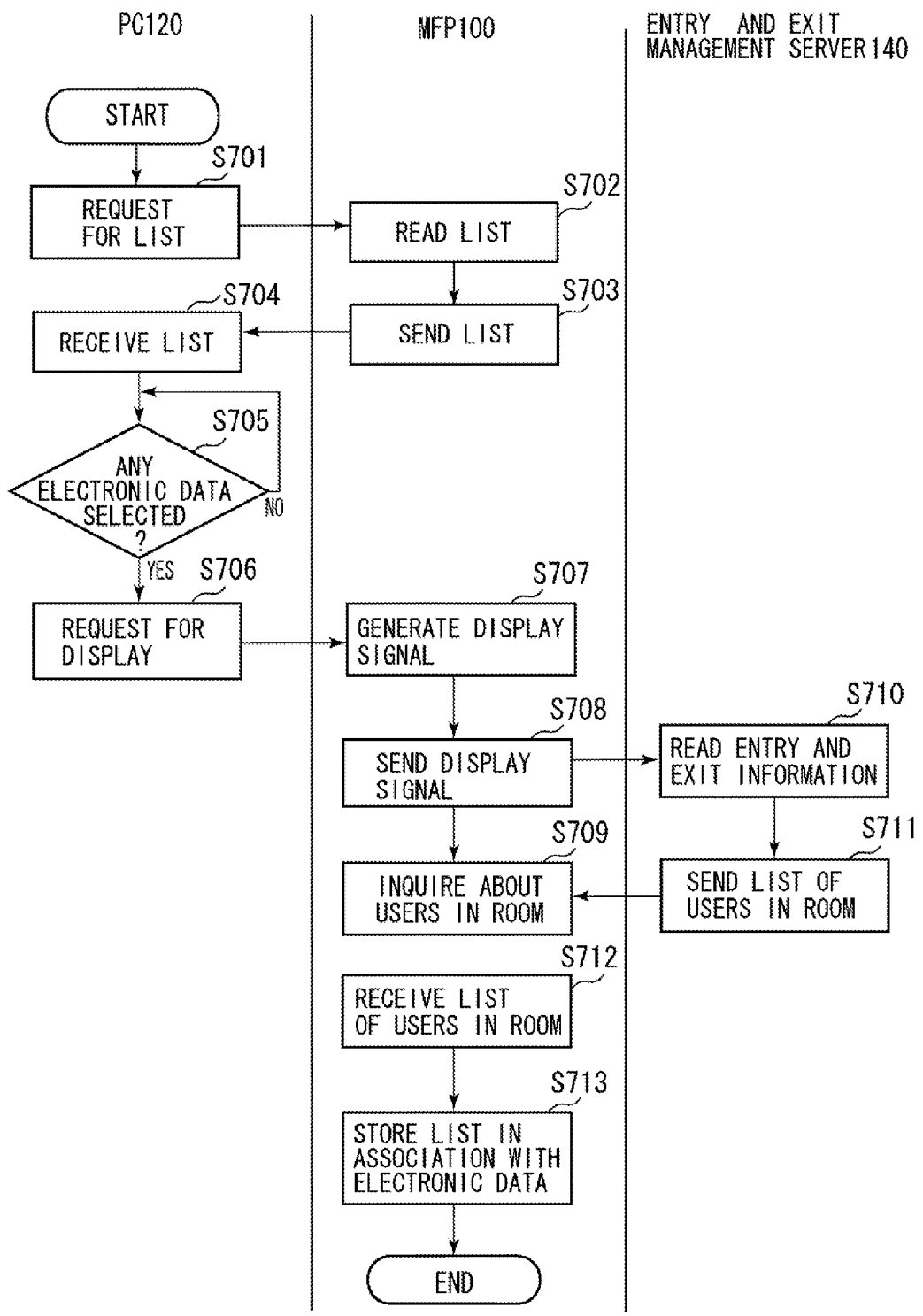
FIG. 7 is a flowchart illustrating an operation for displaying electronic data according to an exemplary embodiment of the present invention.

FIG. 7 is a detailed flowchart illustrating a series of operations for displaying electronic data stored in the HDD 204 of the MFP 100 on the display device 110 during the conference. The CPU 301 of the PC 120, the CPU 201 of the MFP 100, and the CPU 401 of the entry and exit management server 140 control respectively these series of operations in the flowchart of FIG. 7 based on the programs stored in the HDDs 304, 204, and 404.

In step S701, the PC 120 requests the MFP 100 to send the electronic data list in response to user's instructions input via the operation screen displayed on the PC 120. This list summarizes attribute information (file name or creator) of electronic data prestored in the HDD 204 which is to be used as conference materials according to the flowchart of FIG. 5.

In step S702, in response to a request for the electronic data list from the PC 120, the MFP 100 reads the electronic data list stored in the HDD 204. In step S703, the MFP 100 sends the read electronic data list to the requester, the PC 120. In step S704, the PC 120 receives the electronic data list from the MFP 100. Then, in step S705, the PC 120 determines whether a user selects at least one electronic data from the received electronic data list and waits until the user selects any data.

If any electronic data is selected in step S705 (YES in step S705), in step S706, the PC 120 requests the MFP 100 to display the selected electronic data on the display device 110. In step S707, the MFP 100 generates a display signal corresponding to the requested electronic data to be displayed by the PC 120. In step S708, the MFP 100 sends the generated display signal to the display device 110.

Thus, the display device 110 displays the electronic data selected by a user of the PC 120 as conference materials. In step S709, the MFP 100 inquires of the entry and exit management server 140 about users who have entered the conference room. In response to the inquiry, in step S710, the entry and exit management server 140 reads the entry and exit information managed by the entry and exit information management unit 407.

FIG. 8 illustrates an entry and exit information table managed by the entry and exit information management unit 407. In the illustrated example of FIG. 8, detailed information about entry and exit to/from the conference room on Apr. 1, 2007 is recorded. In a field 801, the entry time and exit time of each user are recorded. In a field 802, user IDs of users who have entered or exited the conference room are recorded. In the field 802, user IDs read by the IC card reading unit 406 of the entry and exit management server 140 are recorded.

In a field 803, names of each user who has entered and exited the conference room are recorded. As apparent from an example of FIG. 8, users A to D have entered and exited the conference room. In a field 804, information about whether each user has entered or exited the conference room is recorded. In a field 805, information about users who are present in the conference room at each time is recorded.

The information in the field 805 is updated each time a user enters/exits the conference room. Thus, if another terminal sends an inquiry about entry/exit, the entry and exit information management unit 407 can speedily notify the terminal of users who have entered the conference room at that point. Further, as illustrated in FIG. 8, information about users who entered the room in the past is also managed. Accordingly, the entry and exit information management unit 407 can notify the terminal of users who entered the room at a predetermined time in the past.

Referring back to FIG. 7, in step S711, the entry and exit management server 140 generates the list of users who are currently present in the conference room based on the read entry and exit information, and sends the list to the MFP 100. The list includes information in the field 802 or in the field 803. In step S712, the MFP 100 receives the list of users present in the conference room from the entry and exit management server 140. In step S713, the MFP 100 stores information in the list (user ID etc.) as viewing history information in association with the displayed electronic data.

Figure 9:
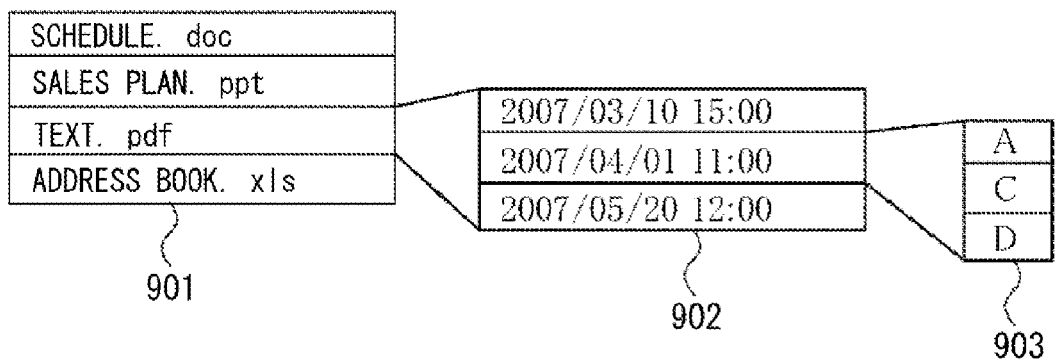
FIG. 9 illustrates viewing history information according to an exemplary embodiment of the present invention.

FIG. 9 illustrates the structure of the viewing history information stored in association with each electronic data stored in the HDD 204. A field 901 records information about a file name of each electronic data stored in the HDD 204. A field 902 records information about date and time when electronic data is displayed in association with each electronic data. A field 903 records information about members who attended the conference at the time of displaying electronic data, that is, information about users who viewed the displayed electronic data.

As seen from an example of FIG. 9, electronic data titled "text.pdf" was displayed at 15:00 on Mar. 10, 2007, at 11:00 on Apr. 1, 2007, and at 12:00 on May 20, 2007. As also seen from FIG. 9, when the data was displayed at 11:00 on Apr. 1, 2007, users A, C, and D stayed in the conference room. In this way, information about users who stay in the conference room at the time of displaying electronic data is stored in association with each electronic data.

In other words, since information about users who have viewed the displayed electronic data is stored in association with each electronic data, a person who viewed the electronic data can be identified later. Next, a process for checking who viewed electronic data that was displayed in the past is described. In this example, if a user designates electronic data stored in the HDD 204 of the MFP 100, information about users who viewed the electronic data is displayed based on viewing history information stored in association with the designated electronic data.

Figure 10:
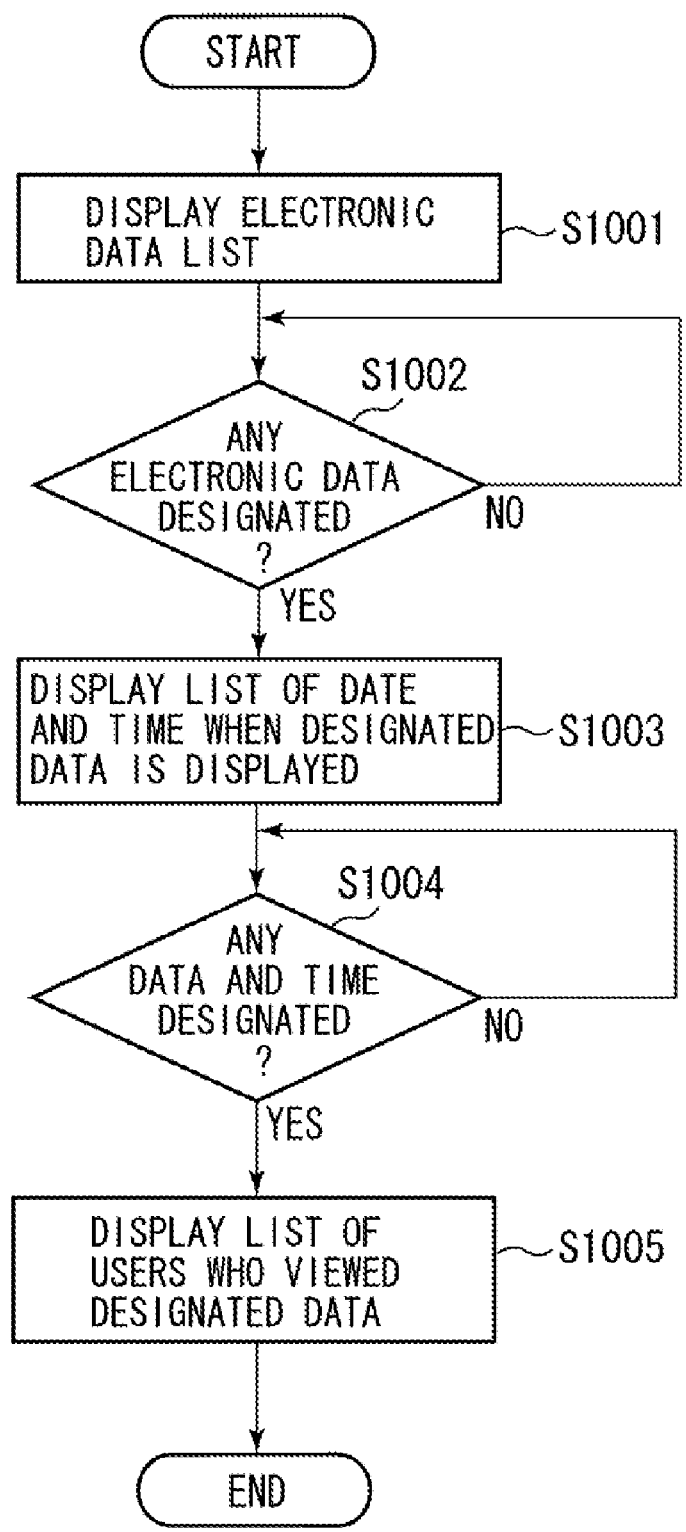
FIG. 10 is a flowchart illustrating an operation of checking viewers of electronic data displayed in the past according to an exemplary embodiment of the present invention.

FIG. 10 is a flowchart illustrating a series of operations for displaying information about a user who viewed electronic data designated by a user. The CPU 201 of the MFP 100 controls these series of operations in the flowchart of FIG. 10 based on programs stored in the HDD 204. In step S1001, the CPU 201 displays the list of electronic data stored in the HDD 204 (information in the field 901) on a liquid crystal panel of the operation unit 220 according to user's instructions input from the operation unit 220 of the MFP 100.

In step S1002, the CPU 201 determines whether a user designates at least one electronic data based on the list displayed in step S1001 and waits until the user designates any data. If any electronic data is designated (YES in step S1002), in step S1003, the CPU 201 displays the list of date and time when the designated electronic data was displayed (information in the field 902) on the liquid crystal panel of the operation unit 220.

In step S1004, the CPU 201 determines whether a user selects at least one date and time from the date and time list displayed in step S1003, and waits until the user selects any date and time. If a certain date and time is designated (YES in step S1004), in step S1005, the CPU 201 displays the list of users who viewed electronic data at the designated date and time (information in the field 903) on the liquid crystal panel of the operation unit 220. In this way, the list of users who viewed the designated electronic data can be displayed.

As described above, in the first exemplary embodiment, electronic data used as conference materials is stored in the HDD 204. Then, a display signal corresponding to the electronic data stored in the HDD 204 is generated to display electronic data on the display device 110. The CPU 201 identifies attendees of the conference based on information read by the IC card reading unit 406, which is entry and exit information managed by the entry and exit information management unit 407.

Then, the HDD 204 stores information about identified attendees in association with the displayed electronic data, as viewing history information. Further, if any user designates electronic data stored in the HDD 204 using the operation unit 220, information about users who viewed the designated electronic data is displayed on the liquid crystal panel of the operation unit 220. Through the above processing, in the first exemplary embodiment, information about attendees of the conference is stored in association with electronic data displayed during the conference, so that a security level can be raised.

In other words, in the case of displaying electronic data including highly-confidential information as conference materials, data about who have viewed the information is stored so as to be checked later so that in the event of leakage of the information it is easy to identify where the information leaks from. Moreover, if the organizer announces that information about users who have viewed confidential information will be stored, leakage of the information can be effectively suppressed.

In the above first exemplary embodiment, the electronic data is stored in response to an instruction from the PC 130 and displayed in response to an instruction from the PC 120, and users who have viewed the electronic data are identified operating the MFP 100. However, the present invention is not limited thereto; if all of the PC 120, the PC 130, and the MFP 100 can send an instruction to execute the above processing, a usability of the system would be increased.

Further, in the above example, the electronic data prestored in the PC 130 is stored in the HDD 204 of the MFP 100 and used as conference materials, but a document image may be scanned by a scanner 240 of the MFP 100 and stored.

Second Exemplary Embodiment

Next, a second exemplary embodiment of the present invention is described. A first point of difference between the second exemplary embodiment and the first exemplary embodiment is that a conference schedule management server 150 is provided in place of the entry and exit management server 140 and attendees of the conference are identified based on information managed by the conference schedule management server 150.

A second point of difference between the second exemplary embodiment and the first exemplary embodiment is to allow search for electronic data based on viewing history information stored in association with each electronic data. In the second exemplary embodiment, portions similar to the first exemplary embodiment are not described, and only differences between the second exemplary embodiment and the first exemplary embodiment are described below.

Figure 11:
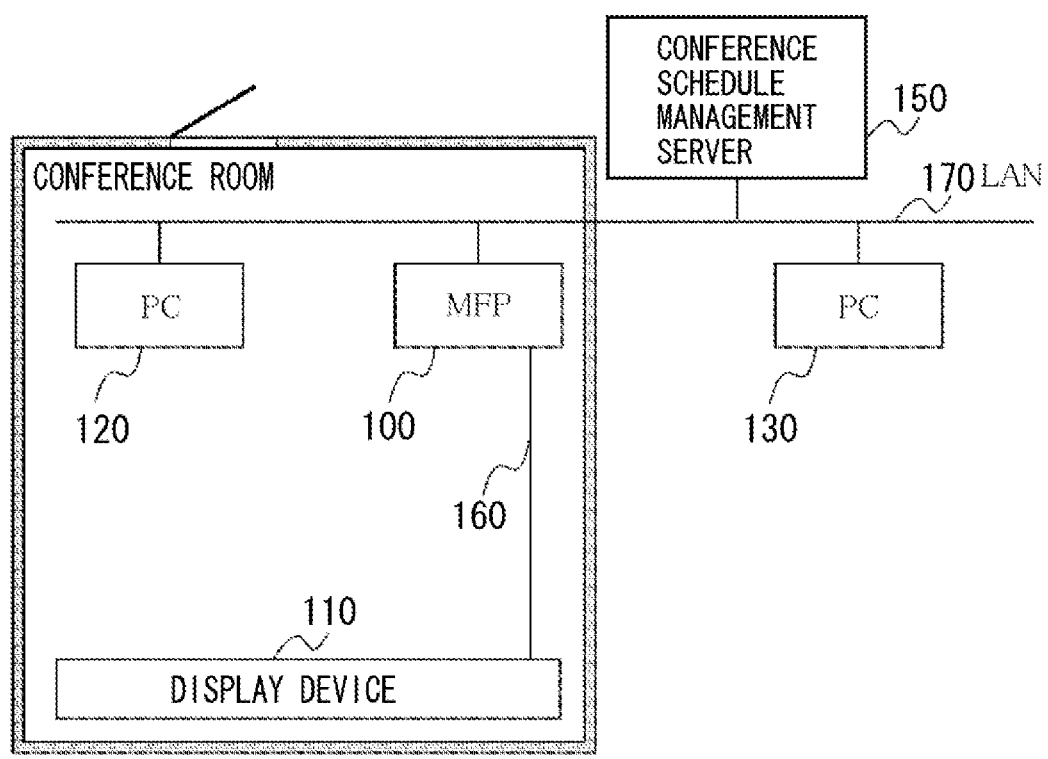
FIG. 11 illustrates the configuration of a conference system according to an exemplary embodiment of the present invention.

FIG. 11 illustrates the entire conference system of the second exemplary embodiment. As illustrated in FIG. 11, in the second exemplary embodiment, the conference schedule management server 150 is provided in place of the entry and exit management server 140 of the first exemplary embodiment. The other devices (the MFP 100, the display device 110, the PC 120, and the PC 130) are similar to the first exemplary embodiment.

Figure 12:
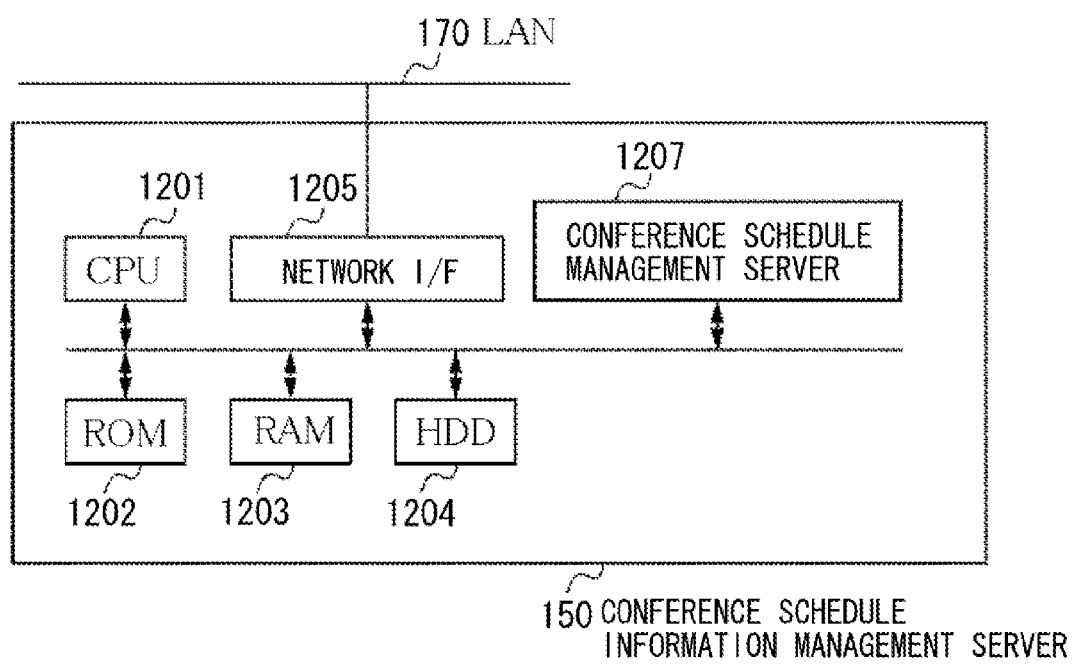
FIG. 12 is a system block diagram illustrating conference schedule management server according to an exemplary embodiment of the present invention.

FIG. 12 is a system block diagram illustrating the conference schedule management server 150. A CPU 1201 controls operations of the conference schedule management server 150 and operates according to programs stored in a RAM 1203. A ROM 1202 is a boot ROM, which stores a boot program for booting a system. An HDD 1204 stores system software and a program for controlling operations of the conference schedule management server 150.

Programs stored in the HDD 1204 are loaded to the RAM 1203, and the CPU 1201 controls operations of the conference schedule management server 150 based on the programs. A network I/F 1205 is connected to the LAN 170 and is used to input/output various kinds of information.

A conference schedule information management unit 1207 manages conference schedule information representing a registered conference schedule. If the PC 130 inquires of the conference schedule management server 150 about a schedule for a particular conference, for example, the conference schedule management server 150 reads conference schedule information managed by the conference schedule information management unit 1207 and sends back a response.

First, processing for registering a conference schedule according to the second exemplary embodiment is described. In this example, a conference schedule is registered by a user operating the PC 130 prior to the conference. FIG. 13 illustrates an operation screen displayed on the display unit 306 of the PC 130. If the PC 130 accesses and requests the MFP 100 to send an HTML file, the web browser functional unit 308 analyzes the HTML file sent from the MFP 100 and display the screen of FIG. 13.

A user enters information corresponding to each item on the operation screen of FIG. 13. The user enters the title of a conference in an entry field 1301. The user enters the date and time of the conference in an entry field 1302. The user enters a place where the conference is held in an entry field 1303. The user enters members who plan to attend the conference in an entry field 1304. When the user presses a register button 1305 after entering necessary information corresponding to each item, a conference schedule is registered based on the input information.

FIG. 14 illustrates a conference schedule information table 1401 managed by the conference schedule information management unit 1207 of the conference schedule management server 150. As illustrated in FIG. 14, a conference schedule information table 1401 manages the information input by the operation screen of FIG. 13.

If a conference schedule is registered using the screen of FIG. 13, a conference room is automatically reserved. More specifically, if a conference schedule is registered as illustrated in FIG. 13, for example, any conference schedule using the same conference room at the same time (at 15:00 to 17:00 on May 1, 2007) cannot be registered after this registration.

Further, if a conference schedule is registered, a folder dedicated to the registered conference is automatically generated in an HDD of an MFP that is set up in a room reserved for the conference. In the example of FIG. 13, since a conference room is reserved for the conference, a folder titled "group meeting" is generated in the HDD 204 of the MFP 100 set up in the conference room. A user can store electronic data that is to be displayed as conference materials in this folder.

Figure 15:
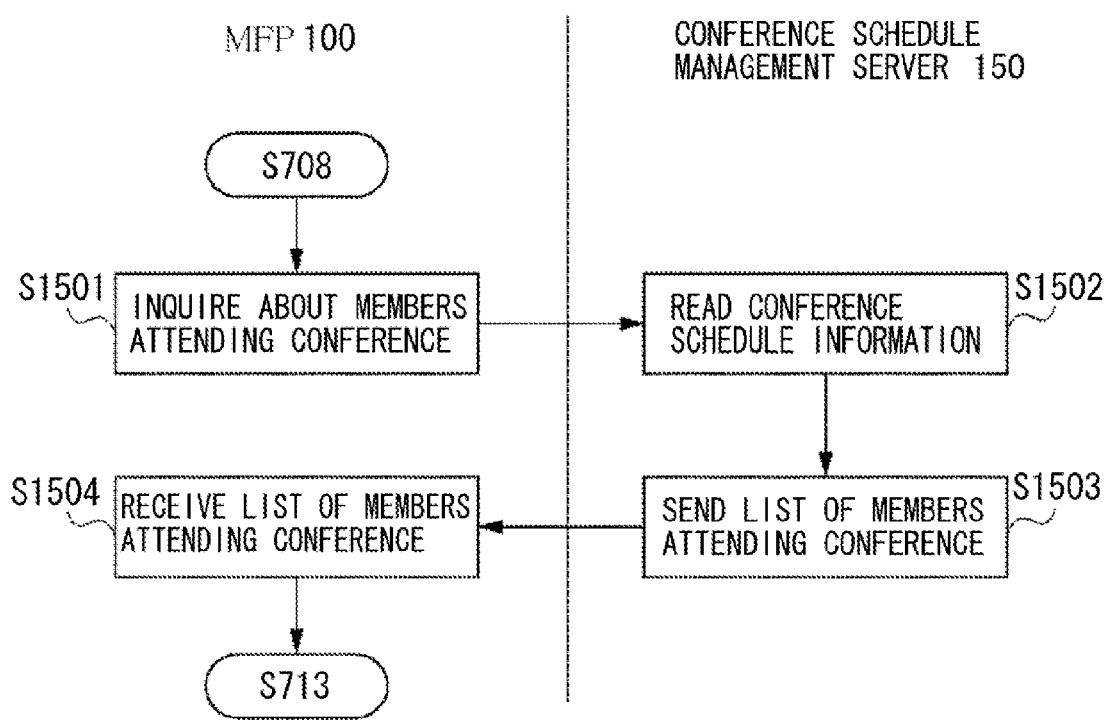
FIG. 15 is a flowchart illustrating an operation for displaying electronic data according to an exemplary embodiment of the present invention.

FIG. 15 is a detailed flowchart illustrating a series of operations for displaying electronic data stored in the HDD 204 of the MFP 100 on the display device 110 in the conference. The processing in steps S701 to S708 and step S713 of the first exemplary embodiment as illustrated in FIG. 7 are similar to the second exemplary embodiment and thus not described; steps executed in place of steps S709 to S712 in FIG. 7 are described with reference to FIG. 15.

The CPU 201 of the MFP 100 and the CPU 1201 of the conference schedule management server 150 respectively control series of operations in the flowchart illustrated in FIG. 15 based on programs stored in the HDDs 204 and 1204. In step S1501, if electronic data is displayed on the display device 110 during the conference, the MFP 100 inquires of the conference schedule management server 150 about attendees of the conference.

Upon receiving the inquiry about attendees of the conference from the MFP 100, the conference schedule management server 150 reads conference schedule information managed by the conference schedule information management unit 1207 in step S1502. The conference schedule management server 150 further identifies users registered as attendees of the conference held in a room where the target MFP 100 is placed, based on the read conference schedule information. Then, the conference schedule management server 150 generates the list of identified users (attendees) in step S1503, and sends the list to the MFP 100.

In step S1504, the MFP 100 receives the list of attendees from the conference schedule management server 150 and advances to step S713. Next, processing for searching for electronic data that was displayed as conference materials in the past is described. In this example, a user operates the MFP 100 to enter a search condition for searching for electronic data stored in the HDD 204, and the MFP 100 searches for the electronic data based on the entered search condition.

Figure 16:
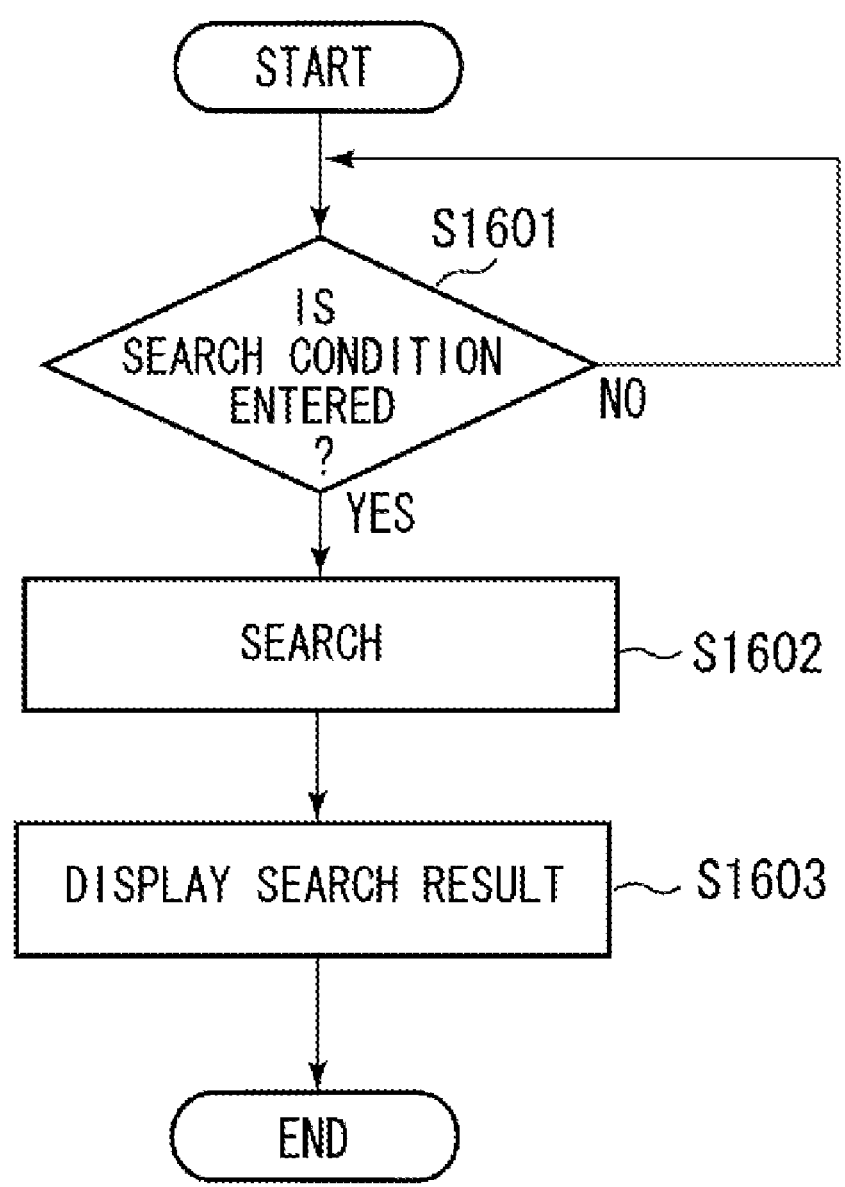
FIG. 16 is a flowchart illustrating an operation for searching for electronic data according to an exemplary embodiment of the present invention.

FIG. 16 is a detailed flowchart illustrating a series of operations for searching for electronic data based on viewing history information. The CPU 201 of the MFP 100 controls these series of operations in the flowchart of FIG. 16 based on programs stored in the HDD 204. In step S1601, the CPU 201 determines whether a user enters a search condition for searching for electronic data stored in the HDD 204 using the operation unit 220 of the MFP 100, and waits until any search condition is entered.

Figure 17:
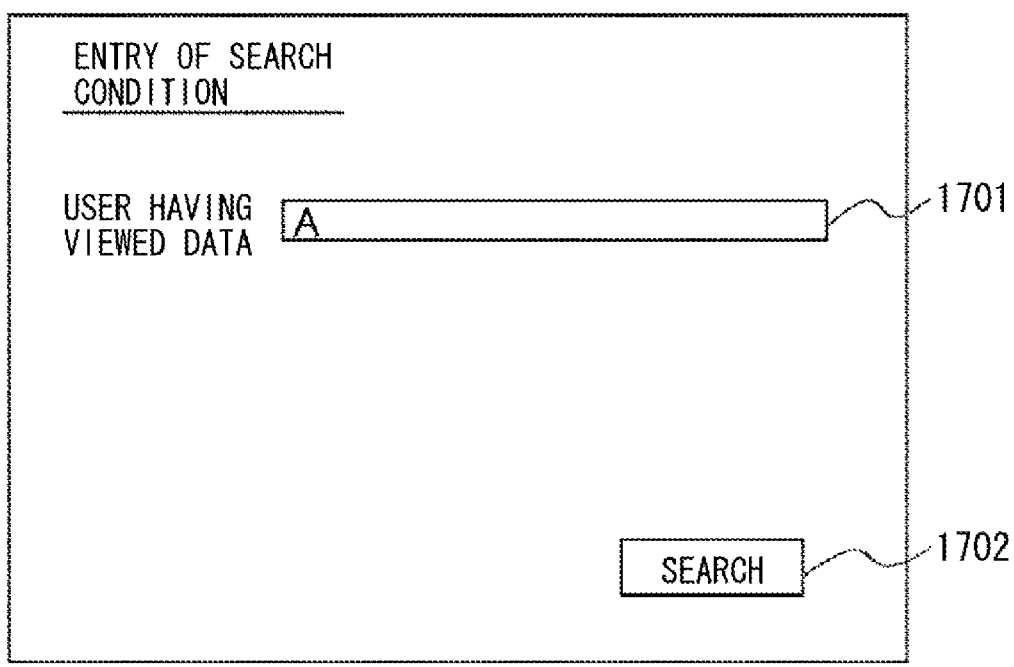
FIG. 17 illustrates an operation screen displayed on a liquid crystal panel of an MFP operation unit according to an exemplary embodiment of the present invention.

If any search condition is entered (YES in step S1601), in step S1602, the CPU 201 searches for electronic data based on the entered search condition. FIG. 17 illustrates an operation screen displayed on a liquid crystal panel of the operation unit 220 of the MFP 100. A user enters a search condition for searching for electronic data using the operation screen. In this example, a user who viewed electronic data is designated and entered in the entry field 1701 as a search condition, and then a search button 1702 is pressed to search for electronic data that was viewed by the designated user.

To be more specific, in executing search, the CPU 201 reads viewing history information managed as illustrated in FIG. 9 and extracts electronic data stored in association with information representing the user entered in the entry field 1701 based on the viewing history information. Then, in step S1603, the CPU 201 displays the extracted electronic data as a search result on the liquid crystal panel of the operation unit 220. In addition to a user, a name, time, or venue of the conference may be designated as a search condition.

As described above, in the second exemplary embodiment, a time and attendees of the conference are registered with the conference schedule information management unit 1207 in advance. Members who have attended the conference when electronic data was displayed are identified based on this information. Further, the CPU 201 of the MFP 100 searches for electronic data using viewing history information stored in association with the electronic data.

Thus, in the second exemplary embodiment, a server manages information about a conference schedule registered in advance. Accordingly, attendees of the conference can be identified without using any special system like the entry and exit management server 140 according to the first exemplary embodiment. Further, the CPU can search for electronic data using viewing history information stored in association with each electronic data. As a result, a user can easily find electronic data that the user has viewed before, and therefore, its usability is improved.

According to the second exemplary embodiment, a conference schedule is registered and the MFP 100 is operated to search for electronic data in response to instructions from the PC 130. However, the present invention is not limited thereto. That is, if any of the PC 120, the PC 130, and the MFP 100 can send an instruction to execute the above processing, a usability of the system may be increased.

Third Exemplary Embodiment

Next, a third exemplary embodiment of the present invention is described. A first difference between the third exemplary embodiment and the first exemplary embodiment is that users who are permitted to view electronic data are set in advance when the electronic data to be used as conference materials is stored. A second difference between the third exemplary embodiment and the first exemplary embodiment is that, if any user is not permitted to view electronic data when the electronic data is displayed, the user can be set as a user who is permitted to view the electronic data.

Figure 18:
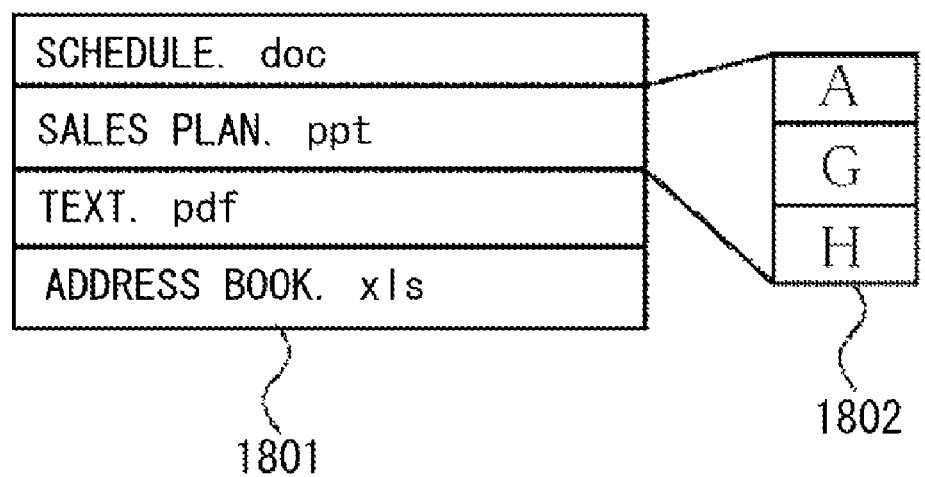
FIG. 18 illustrates an electronic data management table according to an exemplary embodiment of the present invention.

FIG. 18 illustrates a management table for managing electronic data stored in the HDD 204 of the MFP 100 as data to be used as conference material. In a field 1801, information about a file name of each electronic data is recorded. In a field 1802, information about users who are permitted to view electronic data (viewing authority information) is managed in association with each electronic data. The information recorded in the field 1802 is set when a user stores electronic data in the HDD 204 from the PC 120 or PC 130.

Figure 19:
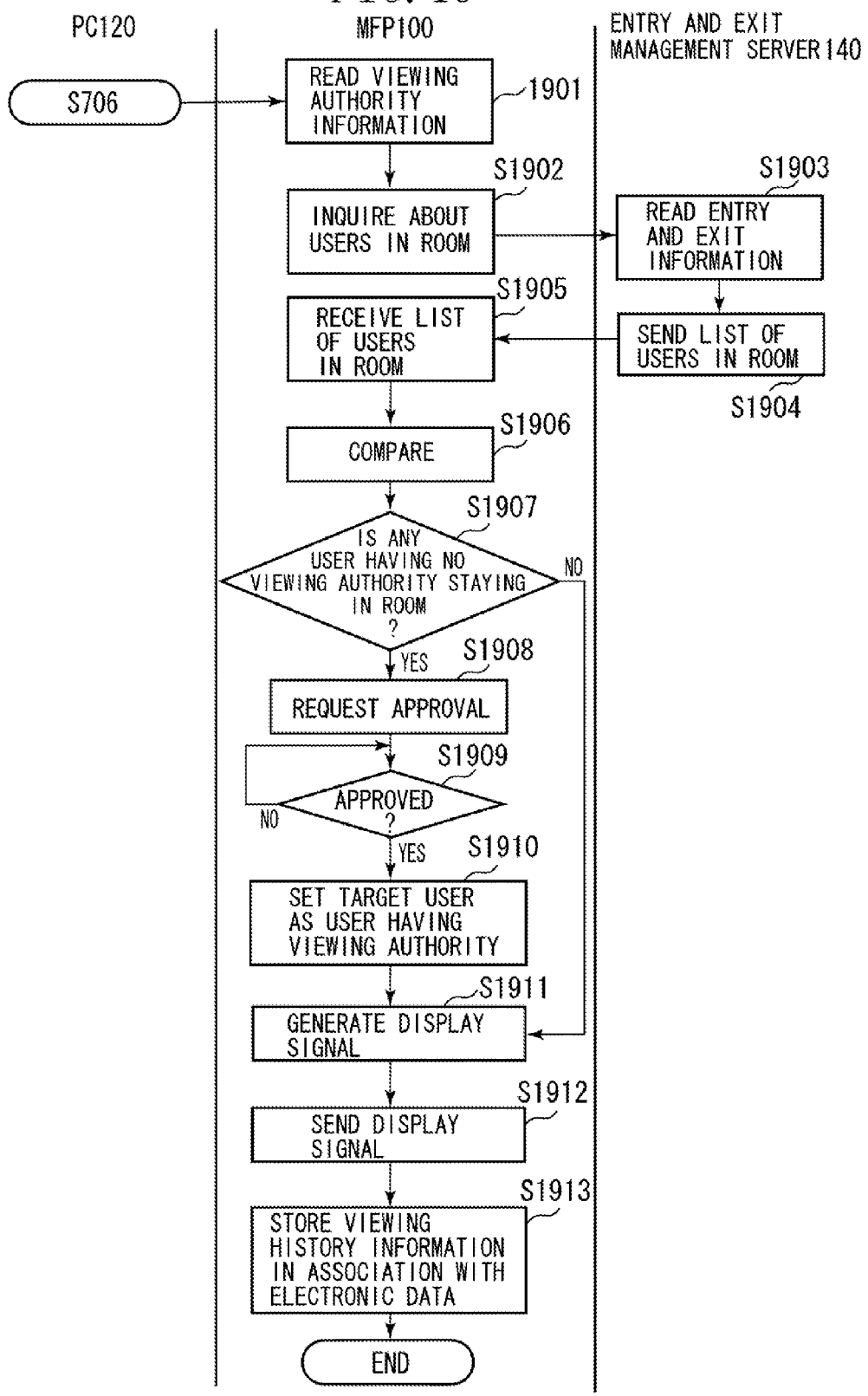
FIG. 19 is a flowchart illustrating an operation for displaying electronic data according to an exemplary embodiment of the present invention.

In the case of registering viewing authority information as described above, it is assumed that a user selects the button 502 on the operation screen of FIG. 5. FIG. 19 is a flowchart illustrating a series of operations for displaying electronic data stored in the HDD 204 of the MFP 100 on the display device 110 in the conference. The processing in steps S701 to S706 in the first exemplary embodiment as illustrated in FIG. 7 is similar to the third exemplary embodiment and thus not described, and steps executed in place of steps S707 to S713 of FIG. 7 are described with reference to FIG. 19.

The CPU 201 of the MFP 100 and the CPU 401 of the entry and exit management server 140 respectively control series of operations in the flowchart illustrated in FIG. 19 based on programs stored in the HDDs 204 and 404. In response to an instruction to display electronic data from the PC 120, the MFP 100 reads viewing authority information of FIG. 18 in step S1901. Then, in step S1902, the MFP 100 inquires of the entry and exit management server 140 as to users staying in the conference room.

In response to the inquiry, the entry and exit management server 140 reads the entry and exit information managed by the entry and exit information management unit 407 in step S1903. The entry and exit management server 140 generates a list of users currently staying in the conference room based on the read entry and exit information, and sends the list to the MFP 100 in step S1904. The MFP 100 receives the list of users staying in the room from the entry and exit management server 140 in step S1905.

In step S1906, the MFP 100 compares each user in the list of users staying in the room, which is sent from the entry and exit management server 140, with users permitted to view electronic data based on the viewing authority information. Then, in step S1907, the MFP 100 determines whether any user who is not permitted to view electronic data to be displayed stays in the conference room. If the MFP 100 determines that everyone staying in the conference room is permitted to the view electronic data (NO in step S1907), the processing advances to step S1911.

On the other hand, if the MFP 100 determines that someone who is not permitted to the view electronic data stays in the conference room (YES in step S1907), in step S1908, the MFP 100 requests the other users to approve that the user not permitted to view the electronic data stays in the conference room. Then, in step S1909, the MFP 100 determines whether users permitted to view the electronic data approve that the user not permitted to view electronic data stays in the room. As for this approval, all users permitted to view the electronic data may give an approval or only one of the users may have the authority to give an approval.

Further, information about the approved user may be stored in association with the electronic data. In step S1909, if the user not permitted to view the electronic data is approved (YES in step S1909) to stay in the room, the MFP 100 sets the user not permitted to view the electronic data as a user permitted to view the electronic data in step S1910. To be specific, the user not included in the viewing authority information of FIG. 18 is permitted to view the electronic data.

The MFP 100 generates a display signal corresponding to the electronic data to be displayed in step S1911 and sends the generated display signal to the display device 110 in step S1912. As a result, the display device 110 displays the electronic data selected by a user of the PC 120 as conference materials. In step S1913, the MFP 100 stores information (user ID) included in the list of users in the conference room that is received from the exit management server 140 as viewing history information in association with the electronic data.

As described above, in the third exemplary embodiment, users who are permitted to view electronic data in advance are registered in the HDD 204 in association with the electronic data. Then, at the time of displaying the electronic data, the CPU 201 determines whether one or some of attendees of the conference are not registered as a user permitted to view the electronic data to be displayed. If some of attendees in the conference are not registered, the CPU 201 restricts displaying of the electronic data.

To be specific, the CPU 201 sends a notification that some attendees of the conference are not permitted to view the electronic data, and displays the electronic data. At this time, the CPU 201 requests the other users to approve the user not permitted to view the electronic data to stay in the room. If approved, the CPU displays the electronic data. Further, the CPU 201 registers the user not permitted to view the electronic data newly as a user permitted to view the electronic data.

Through the above operations, in the third exemplary embodiment, users permitted to view the electronic data are registered in advance in association with the electronic data, and the CPU can send a notification that some users are not permitted to view the electronic data in displaying the electronic data, so that a security level is increased. Further, even if some users are not permitted to view the electronic data, the users can be approved and automatically registered as a user permitted to view the electronic data, so that a usability of the system is improved.

Fourth Exemplary Embodiment

Figure 20:
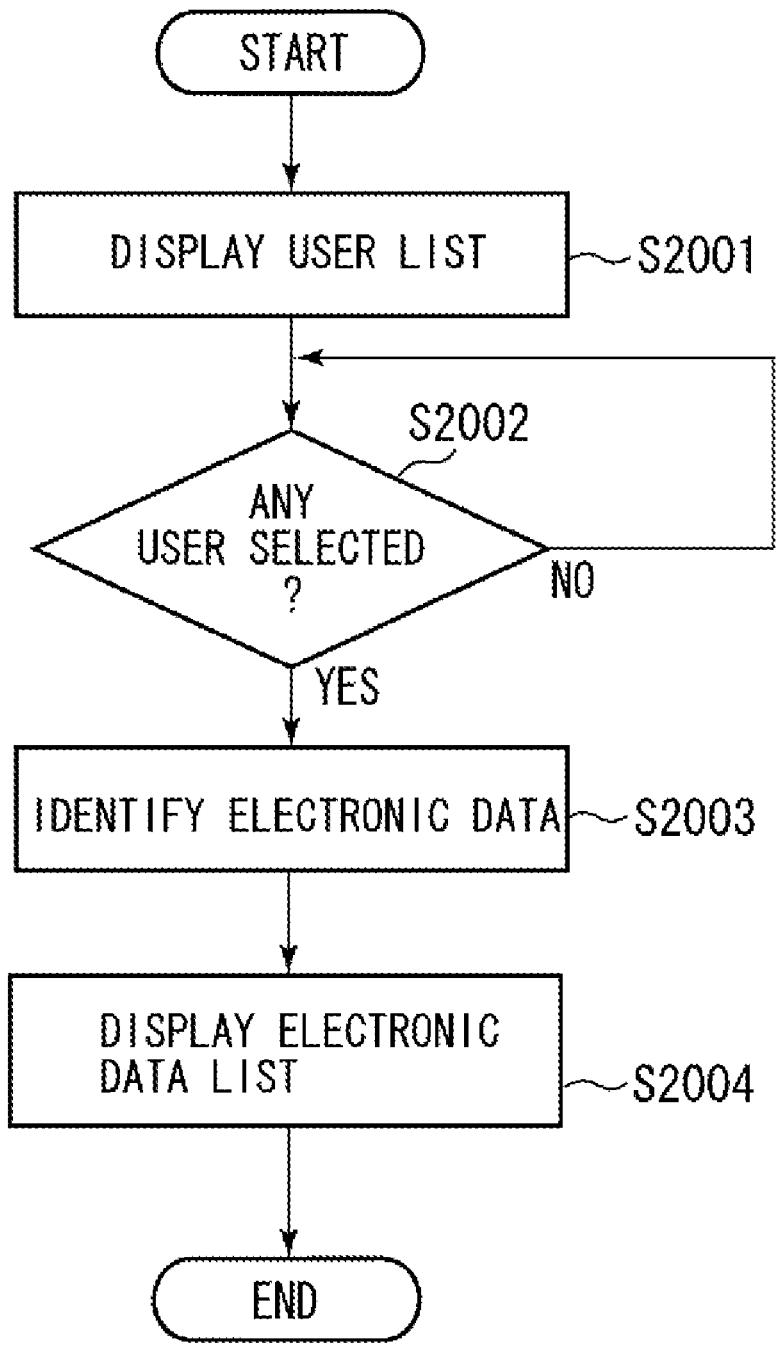
FIG. 20 is a flowchart illustrating an operation for separately displaying electronic data that a user has already viewed and the other electronic data.

Next, a fourth exemplary embodiment of the present invention is described. The fourth exemplary embodiment differs from the first exemplary embodiment in that data that has been viewed by a user and data that has not been used are separately displayed. FIG. 20 is a flowchart illustrating a series of operations for separately displaying electronic data having been viewed by a selected user and the other electronic data. The CPU 201 of the MFP 100 controls series of operations in the flowchart of FIG. 20 based on programs stored in the HDD 204.

In step S2001, the CPU 201 displays the list of users on the liquid crystal panel of the operation unit 220. In step S2002, the CPU 201 determines whether at least one user is selected from the list displayed in step S2001, and waits until any user is selected. If it is determined that any user is selected (YES in step S2002), the processing advances to step S2003. Further, users may be selected using any other method than the above method of selecting a user from the displayed list, for example, based on a user ID input by a user.

In step S2003, the CPU 201 determines electronic data associated with information corresponding to a selected user as viewing history information. To be more specific, the CPU 201 reads the viewing history information of FIG. 9 and separates electronic data associated with information corresponding to a selected user from the other electronic data. In step S2004, the CPU 201 separately displays the electronic data determined in step S2003 and the other electronic data on the liquid crystal panel of the operation unit 220.

FIG. 21 illustrates an operation screen displayed on the liquid crystal panel of the operation unit 220 and an example of the electronic data list. In a field 2101, information indicating a file name of each electronic data is displayed. In a field 2102, information indicating whether a user A viewed each electronic data in the past is displayed. In the example of FIG. 21, a "schedule.doc" and a "text.pdf", which were viewed by the user A in the past and a "sales plan.ppt" and an "address book.xls", which were not viewed by the user A in the past are separately displayed.

As described above, in the fourth exemplary embodiment, when any user is selected by the operation unit 220, the CPU 201 determines electronic data associated with the selected user as viewing history information. Then, the liquid crystal panel of the operation unit 220 separately displays the determined electronic data and the other electronic data.

Through the above operations, in the fourth exemplary embodiment, at the time of displaying the list of electronic data stored in the HDD 204, electronic data that was viewed by a predetermined user and the other electronic data that was not viewed can be separately displayed. In other words, electronic data that was viewed by a predetermined user and the other electronic data that was not viewed can be easily distinguished from each other, so that usability of the system is improved.

Fifth Exemplary Embodiment

Next, a fifth exemplary embodiment of the present invention is described. The fifth exemplary embodiment differs from the first exemplary embodiment in that a user is authenticated, and the authenticated user is permitted to access electronic data that the user viewed in the past but is not permitted to access electronic data that the user did not view in the past.

FIG. 22 is a flowchart illustrating a series of operations for permitting/denying an access of an authenticated user to electronic data based on whether the user viewed target electronic data in the past. The CPU 201 of the MFP 100 controls these series of operations in the flowchart of FIG. 22 based on programs stored in the HDD 204.

In step S2201, the CPU 201 authenticates a user who operates the MFP 100. To be more specific, the CPU 201 allows a user to enter a user ID and password in a login screen displayed on the liquid crystal panel of the operation unit 220, and checks the user against user information previously registered in the HDD 204. As a result, if the user is successfully authenticated (YES in step S2202), the processing advances to step S2203. If the user is not authenticated (the user ID is not registered or a wrong password is entered) (NO in step S2202), the processing is terminated.

In step S2203, the CPU 201 displays the electronic data list stored in the HDD 204. Then, in step S2204, the CPU 201 determines whether at least one piece of electronic data is selected from the electronic data list displayed in step S2203, and waits until any data is selected. In step S2205, the CPU 201 reads viewing history information stored in association with the selected electronic data, and determines whether the authenticated user has viewed the selected electronic data based on the viewing history information.

As a result, if the electronic data was viewed by the authenticated user in the past (YES in step S2205), in step S2206, the CPU 201 permits an access to the electronic data. On the other hand, if the electronic data was not viewed by the authenticated user in the past (NO in step S2205), in step S2207, the CPU 201 denies an access to the electronic data. In this example, all of the electronic data lists are displayed in step S2203 regardless of whether the authenticated user viewed electronic data in the past, but the present invention is not limited to this example. That is, from the beginning, only the list of electronic data that can be accessed by authenticated users may be displayed.

As described above, in the fifth exemplary embodiment, the CPU 201 first authenticates a user. Then, the CPU 201 permits an access to electronic data associated with information about the authenticated user and limits an access to the other electronic data that is not associated with information about the authenticated user.

Through the above operations, in the fifth exemplary embodiment, a user who viewed any electronic data in the past is permitted to access the electronic data, and an access to the other electronic data that was not viewed is limited, so that a security level can be increased. In other words, a user can access electronic data that was displayed in the conference that the user attended but cannot access electronic data that the user did not view in the past. Accordingly, leakage of highly confidential information to the third person can be prevented.

Other Exemplary Embodiments

Embodiments of the present invention can be realized as a system, an apparatus, a method, a program product, or a storage medium (recording medium), for example. In other words, the present invention can be applied to a system constituted by a plurality of devices or an apparatus including a single device.

The present invention can be implemented by directly or indirectly supplying software programs (in the exemplary embodiments, programs corresponding to steps of the illustrated flowchart), which execute the functions of the above exemplary embodiments, to a system or apparatus and by reading and executing the supplied program code with a computer of the system or apparatus.

Accordingly, the program code installed into a computer to execute the functions of the present invention with the computer also implements the present invention. In other words, the present invention encompasses the computer program itself for executing the functions of the present invention. In this case, if computer programs realize the functions or processes of the present invention, the program may be executed in any form, for example, an object code, a program executed by an interpreter, or script data supplied to an operating system (OS).

Computer-readable recording media used for supplying the program include a floppy disk, a hard disk, an optical disk, a magneto-optical (MO) disk, a compact disk read only memory (CD-ROM), a compact disk recordable (CD-R), a compact disk rewritable (CD-RW), a magnetic tape, a non-volatile type memory card, a ROM, and a digital versatile disk (DVD) (DVD-ROM and DVD-R).

In addition, the above program can also be supplied by accessing a web site on the Internet with a browser of a client computer and downloading the program from the web site to a recording medium such as a hard disk. In other words, the above program is supplied by accessing a web page and downloading a computer program of the present invention or a compressed file having an automatic installation function from the web site. Further, the program can be also supplied by dividing the program code constituting the program of the present invention into a plurality of files and downloading each divided file from different web sites. Thus, the scope of the present invention also encompasses a world wide web (WWW) server that allows users to download the program file for executing the functions of the present invention.

Moreover, the program of the present invention may be encrypted and distributed to users in the form of a storage medium such as a CD-ROM. In this case, only users who satisfy predetermined conditions are allowed to download decryption key information from a web site via the Internet. Then, the users execute the encrypted program using the key information and install the program to a computer. In addition, the functions of the above exemplary embodiments can be realized by the computer executing the read program as well as by carrying out whole or a part of the actual processing with an OS running on the computer according to an instruction corresponding to the program.

Further, the functions of the above exemplary embodiments can be implemented when the program read from the recording medium is written to a memory in an expansion board inserted to a computer or an expansion unit connected to the computer. In other words, the functions of the above exemplary embodiments can be implemented by carrying out whole or a part of the actual processing with a CPU in the expansion board or the expansion unit according to an instruction corresponding to the program.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2007-145447 filed May 31, 2007, which is hereby incorporated by reference herein in its entirety.

What is claimed is:

1. A conference system, comprising:
    a storage unit configured to store electronic data, wherein the electronic data is used as conference material;
    a first display unit configured to display the electronic data stored in the storage unit;
    a memory unit configured to store, in a case where the first display unit displays the electronic data, information indicating a user who joins in a conference using the electronic data, the information being stored so as to be associated with the electronic data;
    a first designation unit configured to designate a particular user; and
    a second display unit configured to display, based on the information stored in the memory unit, electronic data such that electronic data which the particular user has already viewed and electronic data which the particular user has not yet viewed are distinguishable by a user.

2. The conference system according to claim 1, further comprising:
    a reading unit configured to read an integrated circuit card to identify the user,
    wherein the memory unit stores information indicating the user read by the reading unit so as to be associated with the electronic data.

3. The conference system according to claim 1, further comprising:
    a management unit configured to manage entry and exit information of the user who enters and exits a conference room containing the display unit,
    wherein the memory unit stores information indicating user who joins in a conference using the electronic data as the conference material, based on the entry and exit information managed by the management unit, so as to be associated with the electronic data.

4. The conference system according to claim 1, further comprising:
    a user registration unit configured to register a user as having permission to view the electronic data stored in the storage unit associated with the electronic data;
    a determination unit configured to determine whether attendees of the conference are users registered with the user registration unit as a user permitted to view the electronic data when the electronic data is displayed on the first display unit; and
    a display control unit configured to display the electronic data on the first display unit upon the determination unit determining whether attendees of the conference are registered by the user registration unit.

5. The conference system according to claim 4, wherein the display control unit sends a notification that the attendees include a user not permitted to view the electronic data upon determination by the determination unit that an attendee is not registered.

6. The conference system according to claim 4, further comprising:
    a request unit configured to request access for a user who is not permitted to view the electronic data,
    wherein upon receiving access by the request unit, the display control unit allows the first display unit to display the electronic data.

7. The conference system according to claim 4, wherein if any user not registered with the user registration unit attends a conference at the time of displaying electronic data on the first display unit, the user registration unit reregisters the unregistered user as a user permitted to view the electronic data displayed.

8. The conference system according to claim 1, further comprising:
a second designation unit configured to designate at least one of a plurality of electronic data stored in the storage unit,
wherein the second display unit displays information about the user who has joined in the conference using the electronic data designated by the designation unit, based on the information stored in the memory unit.

9. A method of controlling a conference system including at least one processor communicatively coupled to a storage unit configured to store electronic data used as conference material and a first display unit configured to display electronic data stored in the storage unit via a bus, comprising:
storing, in a storage medium, in a case where the first display unit displays the electronic data, information indicating a user who joins in a conference using the electronic data, the information being stored so as to be associated with the electronic data;
designating a particular user; and
displaying, by a second display unit, based on the information stored in the memory unit, electronic data such that electronic data which the particular user has already viewed and electronic data which the particular user has not yet viewed are distinguishable by a user.

10. A non-transitory computer-readable storage medium storing a program for causing a computer in a conference system to execute a method of controlling a conference system including at least one processor communicatively coupled to a storage unit configured to store electronic data used as conference material and a first display unit configured to display electronic data stored in the storage unit via a bus, comprising:
storing, in a storage medium, in a case where the first display unit displays the electronic data, information indicating a user who joins in a conference using the electronic data, the information being stored so as to be associated with the electronic data;
designating a particular user; and
displaying, by a second display unit, based on the information stored in the memory unit, electronic data such that electronic data which the particular user has already viewed and electronic data which the particular user has not yet viewed are distinguishable by a user.

* * * * *